(12) United States Patent
Xie et al.

(10) Patent No.: US 8,822,889 B2
(45) Date of Patent: Sep. 2, 2014

(54) TEMPERATURE CONTROL SYSTEM

(75) Inventors: Ling-Yu Xie, Shenzhen (CN); Xing-Ping Xie, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 508 days.

(21) Appl. No.: 13/186,764

(22) Filed: Jul. 20, 2011

(65) Prior Publication Data

US 2012/0160824 A1 Jun. 28, 2012

(30) Foreign Application Priority Data

Dec. 28, 2010 (CN) .......................... 2010 1 0609027

(51) Int. Cl.
*H05B 1/02* (2006.01)

(52) U.S. Cl.
CPC ................................. *H05B 1/0202* (2013.01)
USPC ............ 219/510; 219/497; 219/517; 219/501

(58) Field of Classification Search
CPC ..................................................... H05B 1/0202
USPC .................. 219/497, 505, 506, 510, 517, 519
See application file for complete search history.

(56) References Cited

U.S. PATENT DOCUMENTS

| 4,031,355 A | * | 6/1977 | Leonik, Jr. | 219/502 |
| 5,689,411 A | * | 11/1997 | Chabraya | 363/74 |
| 6,064,044 A | * | 5/2000 | Jerome | 219/501 |
| 6,407,469 B1 | * | 6/2002 | Cline et al. | 307/11 |

* cited by examiner

*Primary Examiner* — Mark Paschall
(74) *Attorney, Agent, or Firm* — Novak Druce Connolly Bove + Quigg LLP

(57) ABSTRACT

A temperature control system includes a temperature control circuit having a plurality of predetermined temperature values, a switch control circuit and a heating control circuit. The temperature control circuit outputs control signals according to the plurality of predetermined temperature values. The switch control circuit turns on according to the control signals and outputs the DC voltage to the heating control circuit which begins to get hot. The temperature control circuit detects a temperature of the heating control circuit from time to time and turns off the switch control circuit when the temperature of the heating control circuit is equal to a selected predetermined temperature.

16 Claims, 2 Drawing Sheets

TEMPERATURE CONTROL SYSTEM

BACKGROUND

1. Technical Field

The disclosure generally relates to control systems, and especially to a temperature control system for testing the performance of electrical devices under different temperatures.

2. Description of Related Art

The performance of electrical devices such as computers, servers, notebooks and so on at different temperatures (thermal performance) is a significant concern. Thermal performance reflects an operational state of the electrical device in different temperature environments. When the thermal performance of an electrical device is tested, a simulation of different temperature environments is needed. Traditionally, a special hot box is designed for testing an electrical device placed therein. The temperature in the hot box can be adjusted. Consequently, the hot box provides a simulated environment at different temperatures for testing the electrical device. However, the special hot box is a very expensive and complex piece of equipment which demands an excessive amount of time in use.

Therefore there is a room for improvement in the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
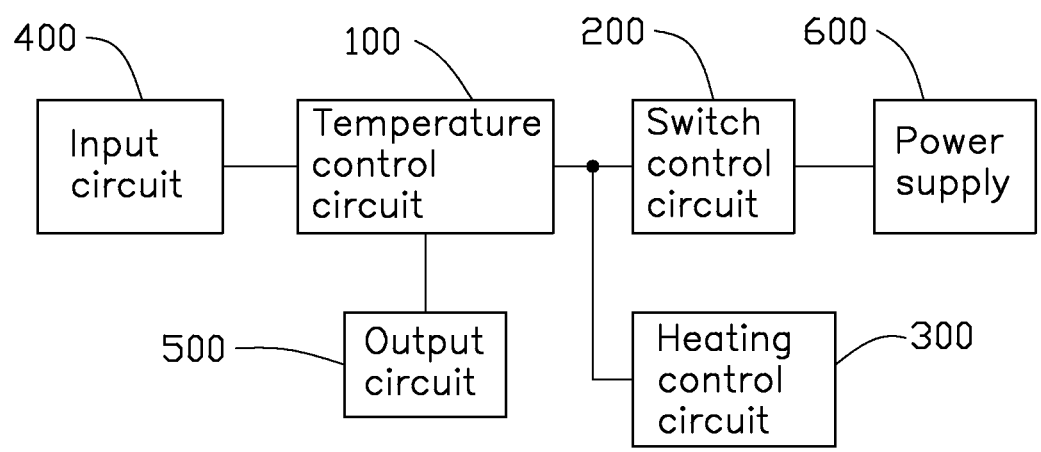
FIG. 1 is a block view of an embodiment of a temperature control system.

Referring to FIG. 1, an embodiment of a temperature control system includes a temperature control circuit 100, a switch control circuit 200, a heating control circuit 300, an input circuit 400, an output circuit 500 and a power supply 600.

The temperature control circuit 100 includes a plurality of predetermined temperature values. The temperature control circuit 100 outputs control signals according to the plurality of predetermined temperature values. The switch control circuit 200 includes a switch control circuit input terminal, a switch control circuit output terminal and a switch control circuit control terminal. The switch control circuit input terminal receives a DC voltage. The switch control circuit control terminal receives the control signal.

The switch control circuit 200 is turned on according to the control signal and outputs the DC voltage at the switch control circuit output terminal. The heating control circuit 300 receives the DC voltage and may produce heat. The temperature control circuit 100 detects a temperature of the heating control circuit 300 and turns off the switch control circuit 200 when the temperature of the heating control circuit 300 is equal to a selected predetermined temperature. At that point, the switch control circuit 200 stops outputting the DC voltage.

In one embodiment, the input circuit 400 includes a keyboard for inputting the selected predetermined temperature values into the temperature control circuit 100. The output circuit 500 includes a display unit (not shown) and an alarm module (not shown). The display unit displays the current temperature of the heating control circuit 300 and the predetermined temperature values available. The alarm module makes a sound to indicate when the temperature of the heating control circuit 300 is equal to the selected predetermined temperature.

Figure 2:
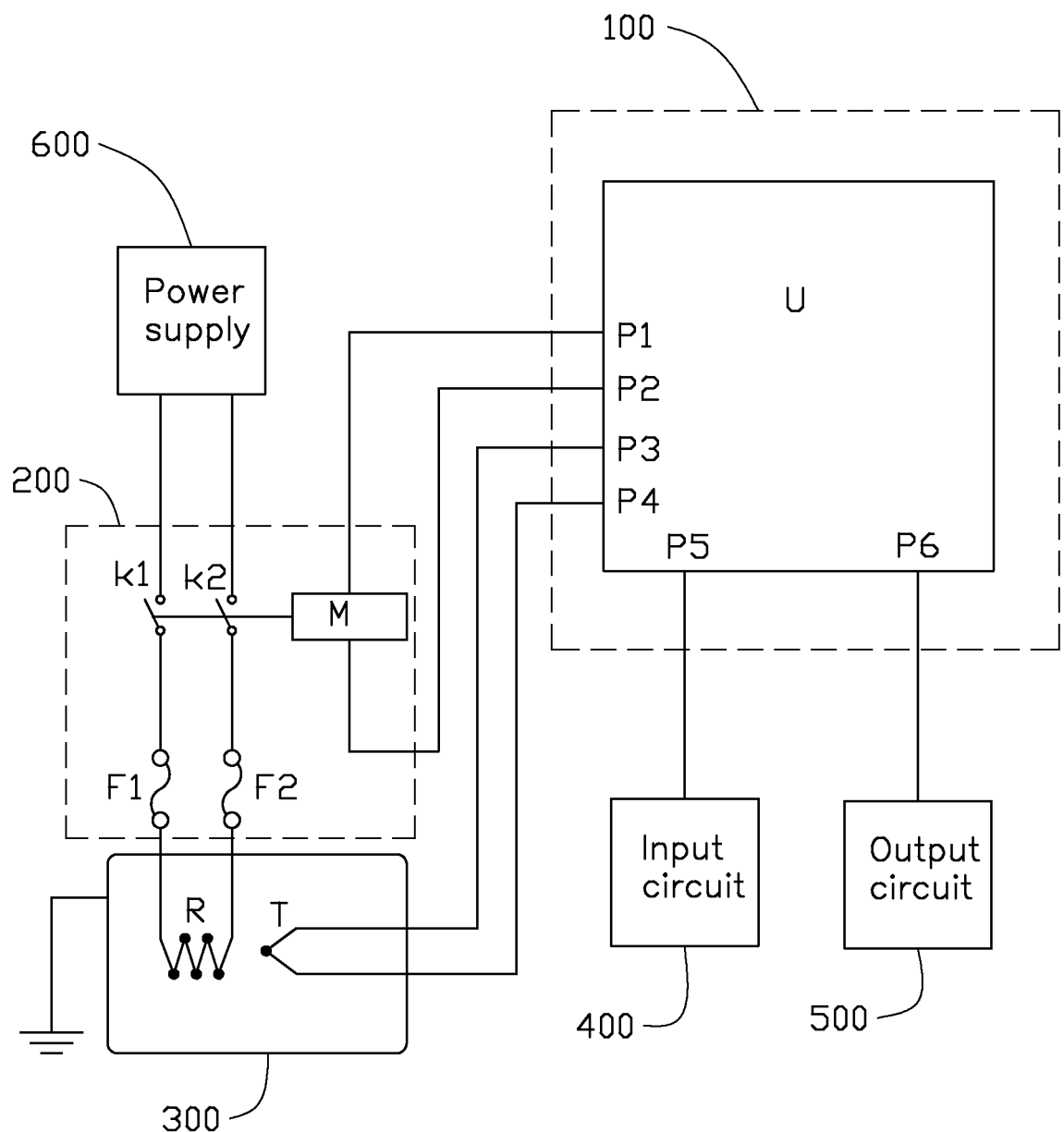
FIG. 2 is a circuit view of the embodiment of FIG. 1.

Referring to FIG. 2, the temperature control circuit 100 includes a temperature control chip U. The temperature control chip U includes a first pin P1, a second pin P2, a third pin P3, a fourth pin P4, a fifth pin P5 and a sixth pin P6. The first pin P1 and the second pin P2 output control signals. The third pin P3 and the fourth pin P4 detect the temperature of the heating control circuit 300. The fifth pin P5 is electrically connected to the input circuit 400. The sixth pin P6 is electrically connected to the output circuit 500.

The switch control circuit 200 includes a delay, a first fuse F1 and a second fuse F2. The first fuse F1 includes a first fuse first terminal and a first fuse second terminal. The second fuse F2 includes a second fuse first terminal and a second fuse second terminal. The delay includes a winding unit M, a first switch unit K1 and a second switch unit K2. The first switch unit K1 includes a first switch unit first terminal and a first switch unit second terminal. The second switch unit K2 includes a second switch unit first terminal and a second switch unit second terminal.

The winding unit M is electrically connected to the first pin P1 and to the second pin P2 for receiving control signals. The first switch unit first terminal and the second switch unit first terminal are electrically connected to the power supply 600 in order to receive the DC voltage. The first switch unit second terminal and the second switch unit second terminal are electrically connected to the first fuse first terminal and the second fuse first terminal. The first fuse second terminal and the second fuse second terminal are electrically connected to the heating control circuit 300.

The heating control circuit 300 includes a heating element R and a temperature-sensing element T. The heating element R includes a heating element first terminal and a heating element second terminal. The temperature-sensing element T includes a temperature-sensing element first terminal and a temperature-sensing element second terminal. The heating element first terminal and the heating element second terminal are electrically connected to the first fuse second terminal and the second fuse second terminal.

The temperature-sensing element first terminal and the temperature-sensing element second terminal are electrically connected to the third pin P3 and the fourth pin P4. The temperature control circuit 100 detects the temperature of the heating control circuit 300 by means of the temperature-sensing element T. In one embodiment, the heating element R is a heating resistor; and the temperature-sensing element T is a thermocouple.

In use, the selected predetermined temperature value is input into the temperature control chip U by the input circuit 400. The temperature control chip U outputs the control signal to the winding unit M. The winding unit M is powered on and closes the first switch unit K1 and the second switch unit K2. The power supply 600 provides the DC voltage to the heating element R and the heating element R begins to heat.

The temperature-sensing element T detects the temperature of the heating control circuit 300 and continuously transmits the temperature of the heating control circuit 300 to the temperature control chip U via the third pin P3 and the fourth pin P4.

When the temperature of the heating control circuit 300 is equal to the selected predetermined temperature value, the temperature control chip U outputs a control signal to turn off the switch control circuit 200. The winding unit M is powered off and the first switch unit K1 and the second switch unit K2 are opened. The power supply 600 stops providing the DC voltage to the heating element R as the temperature control system reaches the selected predetermined temperature value.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and the arrangement of parts within the principles of the disclosure to the full extent indicated by the broad general meaning of the terms in which the appended claims are expressed.

What is claimed is:

1. A temperature control system comprising:
   a temperature control circuit comprising a plurality of predetermined temperature values; the temperature control circuit is adapted to output control signals according to the plurality of predetermined temperature values;
   a switch control circuit comprising a switch control circuit input terminal, a switch control circuit output terminal and a switch control circuit control terminal; the switch control circuit input terminal is adapted to receive a DC voltage; the switch control circuit control terminal is adapted to receive the control signals; and the switch control circuit is adapted to turn on according to the control signals and output the DC voltage at the switch control circuit output terminal; the switch control circuit comprises a delay, a first fuse and a second fuse; the delay comprises a winding unit, a first switch unit and a second switch unit; the winding unit is adapted to receive the control signals; the first switch unit and the second switch unit are adapted to receive the DC voltage; the first switch unit and the second switch unit are electrically connected to the heating control circuit via the first fuse and the second fuse respectively; and
   a heating control circuit adapted to receive the DC voltage and emit heat; wherein the temperature control circuit is adapted to detect a temperature of the heating control circuit and turn off the switch control circuit when the temperature of the heating control circuit is equal to a selected predetermined temperature value; and the switch control circuit is adapted to stop outputting the DC voltage.

2. The temperature control system of claim 1, further comprising an input circuit and an output circuit; the input circuit is adapted to input the selected predetermined temperature value in the temperature control circuit; and the output circuit is adapted to display the temperature of the heating control circuit and the corresponding predetermined temperature values and indicate that the temperature of the heating control circuit is equal to the selected predetermined temperature value.

3. The temperature control system of claim 2, wherein the input circuit comprises a keyboard; and the output circuit comprises a display unit and an alarm unit.

4. The temperature control system of claim 2, wherein the temperature control circuit comprises a temperature control chip; the temperature control chip comprises a first pin, a second pin, a third pin and a fourth pin; the first pin and the second pin are adapted to output the control signals; and the third pin and the fourth pin are adapted to detect the temperature of the heating control circuit.

5. The temperature control system of claim 4, wherein the temperature control circuit further comprises a fifth pin and a sixth pin electrically connected to the input circuit and the output circuit.

6. The temperature control system of claim 4, wherein the first fuse comprises a first fuse first terminal and a first fuse second terminal; the second fuse comprises a second fuse first terminal and a second fuse second terminal; the first switch unit comprises a first switch unit first terminal and a first switch unit second terminal; the second switch unit comprises a second switch unit first terminal and a second switch unit second terminal; the winding unit is electrically connected to the first pin and the second pin for receiving the control signals; the first switch unit first terminal and the second switch unit first terminal are electrically connected to a power input terminal for receiving the DC voltage; the first switch unit second terminal and the second switch unit second terminal are electrically connected to the first fuse first terminal and the second fuse first terminal; and the first fuse second terminal and the second fuse second terminal are electrically connected to the heating control circuit.

7. The temperature control system of claim 6, wherein the heating control circuit comprises a heating element and a temperature-sensing element; the heating element comprises a heating element first terminal and a heating element second terminal; the temperature-sensing element comprises a temperature-sensing element first terminal and a temperature-sensing element second terminal; the heating element first terminal and the heating element second terminal are electrically connected to the first fuse second terminal and the second fuse second terminal; the temperature-sensing element first terminal and the temperature-sensing element second terminal are electrically connected to the third pin and the fourth pin; and the temperature control circuit is adapted to detect the temperature of the heating control circuit by the temperature-sensing element.

8. The temperature control system of claim 7, wherein the heating element is a heating resistor; and the temperature-sensing element is a thermocouple.

9. A temperature control system comprising:
   a temperature control circuit comprising a plurality of predetermined temperature values; the temperature control circuit is adapted to output control signals according to the plurality of predetermined temperature values;
   a switch control circuit adapted to receive a DC voltage and the control signals, turn on according to the control signals and output the DC voltage; the switch control circuit comprises a delay, a first fuse and a second fuse; the delay comprises a winding unit, a first switch unit and a second switch unit; the winding unit is adapted to receive the control signals; the first switch unit and the second switch unit are adapted to receive the DC voltage; the first switch unit and the second switch unit are electrically connected to the heating control circuit via the first fuse and the second fuse respectively; and
   a heating control circuit adapted to receive the DC voltage and emit heat; wherein the temperature control circuit is adapted to detect a temperature of the heating control circuit and turn off the switch control circuit when the temperature of the heating control circuit is equal to a selected predetermined temperature value; and the switch control circuit is adapted to stop outputting the DC voltage.

10. The temperature control system of claim 9, wherein the switch control circuit comprises a switch control circuit input terminal, a switch control circuit output terminal and a switch control circuit control terminal; the switch control circuit input terminal is adapted to receive the DC voltage; the switch control circuit control terminal is adapted to receive the control signals; and the switch control circuit output terminal is adapted to output the DC voltage.

11. The temperature control system of claim 9, further comprising an input circuit and an output circuit; the input circuit is adapted to input the selected predetermined temperature value in the temperature control circuit; and the output circuit is adapted to display the temperature of the heating control circuit and the corresponding predetermined temperature values and indicate that the temperature of the heating control circuit is equal to the selected predetermined temperature value.

12. The temperature control system of claim 11, wherein the input circuit comprises a keyboard; and the output circuit comprises a display unit and an alarm unit.

13. The temperature control system of claim 11, wherein the temperature control circuit comprises a temperature control chip; the temperature control chip comprises a first pin, a second pin, a third pin and a fourth pin; the first pin and the second pin are adapted to output the control signals; and the third pin and the fourth pin are adapted to detect the temperature of the heating control circuit.

14. The temperature control system of claim 13, wherein the temperature control circuit further comprises a fifth pin and a sixth pin electrically connected to the input circuit and the output circuit.

15. The temperature control system of claim 13, wherein the first fuse comprises a first fuse first terminal and a first fuse second terminal; the second fuse comprises a second fuse first terminal and a second fuse second terminal; the first switch unit comprises a first switch unit first terminal and a first switch unit second terminal; the second switch unit comprises a second switch unit first terminal and a second switch unit second terminal; the winding unit is electrically connected to the first pin and the second pin for receiving the control signals; the first switch unit first terminal and the second switch unit first terminal are electrically connected to a power input terminal for receiving the DC voltage; the first switch unit second terminal and the second switch unit second terminal are electrically connected to the first fuse first terminal and the second fuse first terminal; and the first fuse second terminal and the second fuse second terminal are electrically connected to the heating control circuit.

16. The temperature control system of claim 15, wherein the heating control circuit comprises a heating element and a temperature-sensing element; the heating element comprises a heating element first terminal and a heating element second terminal; the temperature-sensing element comprises a temperature-sensing element first terminal and a temperature-sensing element second terminal; the heating element first terminal and the heating element second terminal are electrically connected to the first fuse second terminal and the second fuse second terminal; the temperature-sensing element first terminal and the temperature-sensing element second terminal are electrically connected to the third pin and the fourth pin; and the temperature control circuit is adapted to detect the temperature of the heating control circuit by the temperature-sensing element.

\* \* \* \* \*